S. P. Hopkins,
Churn Dasher,

Nº 81,372. Patented Aug. 25, 1868.

Witnesses
E. M. Dennison
F. H. Joyner

Inventor
Sam'l P. Hopkins
by J. B. Woodruff & Son

United States Patent Office.

SAMUEL P. HOPKINS, OF PORT DEPOSIT, MARYLAND.

Letters Patent No. 81,372, dated August 25, 1868.

IMPROVEMENT IN CHURN-DASHER AND LID.

*The Schedule referred to in these Letters Patent and making part of the same.*

TO ALL WHOM IT MAY CONCERN:

Be it known that I, SAMUEL P. HOPKINS, of Port Deposit, in the county of Cecil, and State of Maryland, have invented certain new and useful improvements in Churn-Dashers and Lids, namely, "The Maryland Star-Dasher Parlor-Churn;" and the following is a full, clear, and exact description of the same, reference being had to the accompanying drawings, making a part of this specification, in which—

Figure 1:
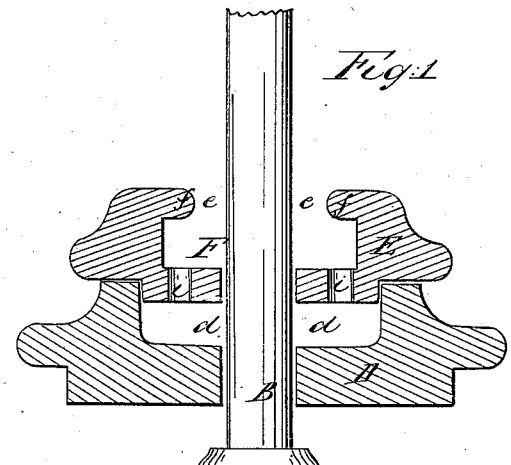
Figure 1 represents a vertical section of the dasher, the staff or handle, and a cross-section through the double lids.
Figure 3:
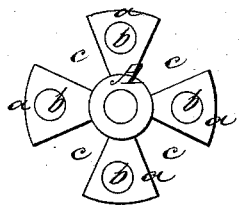
Figure 3 is a flat view of one of the star-dashers.
Figure 2:
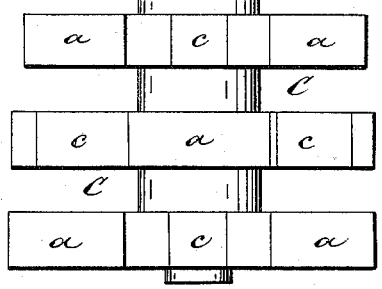
Figure 2 shows a top view of the lid or cover of the star-dasher parlor-churn.
Figure 2:
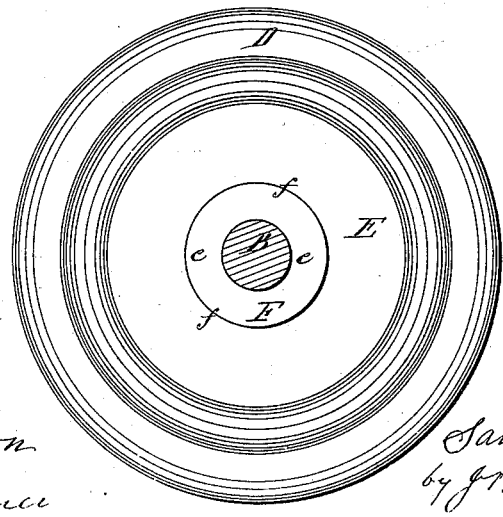

The object of my invention is to churn butter in the best and easiest manner by an up-and-down movement of the dasher, and at the same time prevent the milk or cream from working out at the centre opening, splashing over, and spattering the floor or carpet.

And it consists in the construction and arrangement of the dashers, and the formation and combination of the double-recessed cover or lid therewith.

To enable others to make and use my invention, I will describe it more in detail, referring to the drawings, and to the letters marked thereon.

I make the dasher of any hard wood, such as beech, cherry, maple, or hickory, in the form of a Maltese cross, A, the wings $a\ a\ a$ having recesses $b\ b\ b\ b$, or sunken places on both sides, a series of them being secured to the vertical staff or handle B, leaving spaces C C between them, of about the same width as the thickness of the blades or wings $a\ a$, which are placed on the staff so that the wings $a\ a$ come opposite the spaces, alternately breaking joints, so that the cream is parted right and left, giving it a zigzag motion as the dasher is moved up and down.

To prevent any of the cream from working out at the top, around the staff or handle B, I make a recess or cup, $d\ d$, in the lid D, which fits into the churn.

Into the top of the cup $d\ d$, I fit another lid or cover, E, with a similar cup or recess, F, except the opening $e\ e$, being reduced in size by an overhanging ledge $f\ f$, under which is a series of holes, $i\ i$, through, to admit any milk or cream that might possibly get above the upper lid to drain through back again into the recess or cup $d\ d$, and back into the churn.

The holes $i\ i$ through the lid E may be dispensed with, as it is found in practice that so little milk or cream can get above the upper lid, and there is no probability of a single drop being thrown over the ledge $f\ f$ to bespatter anything around.

Thus it will be seen that the construction and arrangement of the star-dasher will greatly agitate the contents of the churn and produce good butter in a short time, and while in operation not a single drop of milk or cream can splash over the top to bespatter the floor or carpet.

Hence, the churning of butter can as well be done in a parlor, or when a person is dressed in costly garments, as to have a place especially and garments to bespatter, and also considerable saving of the material.

Most persons who keep one or more cows, and make butter for their own use, prefer, and generally use, the old-fashioned dasher-churns, and many in the country have but few rooms, so that my improved Maryland star-dasher parlor-churn is greatly appreciated.

What I claim as my invention, and desire to secure by Letters Patent, is—

1. The star-dasher, constructed and arranged substantially in the manner as herein described, for the purposes specified.

2. The double lid or covers D E, for dasher-churns, when constructed in the manner herein described.

3. The combination of the star-dasher and double cover, as and for the purposes set forth.

SAMUEL P. HOPKINS.

Witnesses:
J. L. BALLANCE,
GEORGE A. LOVE.